US012578908B2

(12) United States Patent
Mochizuki

(10) Patent No.: US 12,578,908 B2
(45) Date of Patent: Mar. 17, 2026

(54) INFORMATION PROCESSING DEVICE, INFORMATION PROCESSING SYSTEM, INFORMATION PROCESSING METHOD, AND NON-TRANSITORY COMPUTER READABLE MEDIUM FOR SETTING DEVICE NAME FOR NETWORK SERVICE FROM SETTING SCREEN

(71) Applicant: FUJIFILM Business Innovation Corp., Tokyo (JP)

(72) Inventor: Akiko Mochizuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 880 days.

(21) Appl. No.: 17/536,091

(22) Filed: Nov. 28, 2021

(65) Prior Publication Data

US 2023/0063316 A1 Mar. 2, 2023

(30) Foreign Application Priority Data

Aug. 30, 2021 (JP) ................................. 2021-140262

(51) Int. Cl.
*G06F 3/12* (2006.01)
(52) U.S. Cl.
CPC .......... *G06F 3/1253* (2013.01); *G06F 3/1205* (2013.01); *G06F 3/1288* (2013.01)
(58) Field of Classification Search
None
See application file for complete search history.

(56) References Cited

U.S. PATENT DOCUMENTS

| | | | | |
|---|---|---|---|---|
| 2006/0256373 A1* | 11/2006 | Matsumoto | ........... | G06F 3/1254 |
| | | | | 358/1.15 |
| 2012/0026541 A1* | 2/2012 | Kobayashi | ............ | G06F 3/1284 |
| | | | | 358/1.15 |
| 2018/0069752 A1* | 3/2018 | Igarashi | .............. | H04L 41/0853 |
| 2019/0000376 A1* | 1/2019 | Rahman | .............. | A61M 16/024 |
| 2020/0081612 A1 | 3/2020 | Yamamoto et al. | | |
| 2021/0232350 A1* | 7/2021 | Kakitsuba | .......... | G06K 15/1868 |
| 2022/0173964 A1* | 6/2022 | Iijima | ................. | H04L 41/0843 |

(Continued)

FOREIGN PATENT DOCUMENTS

| | | | | |
|---|---|---|---|---|
| EP | 4261543 A1 * | 10/2023 | ............. | G16H 40/40 |
| JP | 3829655 | 10/2006 | | |

(Continued)

OTHER PUBLICATIONS

"Office Action of Japan Counterpart Application", issued on Jun. 17, 2025, with English translation thereof, pp. 1-8.

(Continued)

*Primary Examiner* — Akwasi M Sarpong
*Assistant Examiner* — Pawan Dhingra
(74) *Attorney, Agent, or Firm* — JCIPRNET

(57) ABSTRACT

An information processing device includes a processor configured to: acquire, when setting a device name for a predetermined network service, held information held by a device; output a setting screen for displaying the acquired held information and setting the acquired held information as the device name; and receive a result of selection of the held information from the setting screen and set the selected held information as the device name for the network service.

16 Claims, 12 Drawing Sheets

50

| DEVICE NAME | |
|---|---|

Office Printer 123/ AUTHENTICATION REQUIRED (SALES DEPARTMENT)

| ■ | IMAGE FORMING DEVICE NAME | Office Printer 123 |
|---|---|---|
| ☐ | LOCATION | 18F |
| ☐ | ORGANIZATION | SALES G1 |
| ☐ | IP ADDRESS | 192.0.2.1 |
| ☐ | MAC ADDRESS | 00:00:5E:00:53:AA |
| ■ | AUTHENTICATION | AUTHENTICATION REQUIRED |
| ■ | USER FOR AUTHENTICATION | SALES DEPARTMENT |
| ☐ | ENCRYPTION | TLS1.0 |
| ☐ | MAXIMUM PAPER SIZE | A4 |
| ☐ | COLOR | C |
| ☐ | STAPLE | ST1, 2 |
| ☐ | HOLE PUNCH | P2, 4 |

(56)                    References Cited

U.S. PATENT DOCUMENTS

| | | | |
|---|---|---|---|
| 2022/0191334 A1* | 6/2022 | Kajiyama | H04N 1/4433 |
| 2023/0009449 A1* | 1/2023 | Akiyama | H04W 12/50 |
| 2024/0003924 A1* | 1/2024 | Yokotsuka | G01N 35/00732 |

FOREIGN PATENT DOCUMENTS

| | | | |
|---|---|---|---|
| JP | 2013132893 | | 7/2013 |
| JP | 2013132893 A | * | 7/2013 |
| JP | 202042370 | | 3/2020 |
| JP | 2021039617 | | 3/2021 |
| WO | 2021117170 | | 6/2021 |

OTHER PUBLICATIONS

"Office Action of Japan Counterpart Application", issued on Aug. 26, 2025, with English translation thereof, p. 1-p. 6.

* cited by examiner

START

↓

ACQUIRE HELD INFORMATION — 100

↓

GENERATE AND DISPLAY SETTING
SCREEN BASED ON HELD INFORMATION — 102

↓

PERFORM SETTING
RECEPTION PROCESSING — 104

↓

SETTING RECEPTION
COMPLETED? — 106    N

↓ Y

ISSUE DEVICE REGISTRATION REQUEST — 108

↓

NOTIFY SET DEVICE NAME — 110

↓

END

INFORMATION PROCESSING DEVICE, INFORMATION PROCESSING SYSTEM, INFORMATION PROCESSING METHOD, AND NON-TRANSITORY COMPUTER READABLE MEDIUM FOR SETTING DEVICE NAME FOR NETWORK SERVICE FROM SETTING SCREEN

CROSS-REFERENCE TO RELATED APPLICATIONS

This application is based on and claims priority under 35 USC 119 from Japanese Patent Application No. 2021-140262 filed Aug. 30, 2021.

BACKGROUND

(i) Technical Field

The present disclosure relates to an information processing device, an information processing system, an information processing method, and a non-transitory computer readable medium.

(ii) Related Art

An image forming device is suggested in Japanese Unexamined Patent Application Publication No. 2013-132893. When authentication of a user is successful, the image forming device acquires a list of printers registered to be used by the user from a printing service. In the case where the registered printer list includes a printer whose name is the same as a name stored in the image forming device, the image forming device enables, using a user interface for selecting a printer, the printer corresponding to the name to be selected.

SUMMARY

In the case of a network service including a plurality of devices connected together, the plurality of devices are registered in the network service. It is thus difficult to identify a desired device out of the plurality of devices. Although a device name that is easily identifiable may be created and set by a user, a complicated operation such as creating an easily identifiable name is required for the user.

Aspects of non-limiting embodiments of the present disclosure relate to an information processing device, an information processing system, an information processing method, and a non-transitory computer readable medium that are capable of easily setting, as a device name, information with which a desired device is able to be easily identified, compared to a case where a user creates and sets a name with which a device is able to be easily identified.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to acquire, when setting a device name for a predetermined network service, held information held by a device; output a setting screen for displaying the acquired held information and setting the acquired held information as the device name; and receive a result of selection of the held information from the setting screen and set the selected held information as the device name for the network service.

BRIEF DESCRIPTION OF THE DRAWINGS

Exemplary embodiments of the present disclosure will be described in detail based on the following figures, wherein.

DETAILED DESCRIPTION

Figure 1:
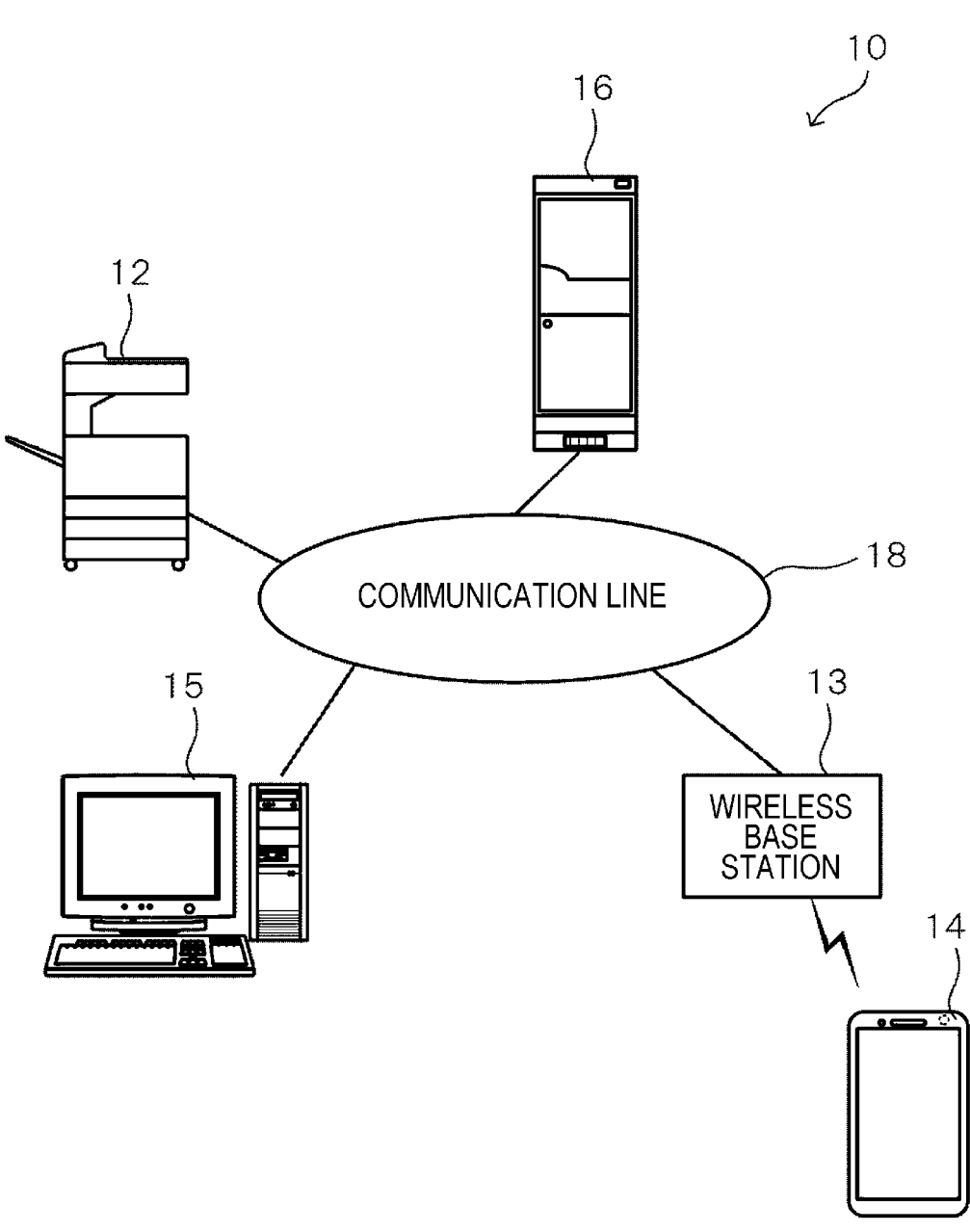
FIG. 1 is a diagram illustrating a schematic configuration of an information processing system according to an exemplary embodiment.

Exemplary embodiments will be described in detail with reference to drawings. In an exemplary embodiment, an information processing system including an image forming device, a cloud server, a client computer, and a wireless base station that are connected by a communication line such as various networks will be described as an example. FIG. 1 is a diagram illustrating a schematic configuration of an information processing system 10 according to an exemplary embodiment.

The information processing system 10 according to this exemplary embodiment includes, as illustrated in FIG. 1, an image forming device 12, a wireless base station 13, a client computer 15, and a cloud server 16. In FIG. 1, only one image forming device 12 and only one client computer 15 are illustrated. However, two or more image forming devices 12 and two or more client computers 15 may be provided. Alternatively, two or more image forming devices 12 and only one client computer 15 may be provided or only one image forming device 12 and two or more client computers 15 may be provided.

The image forming device 12, the wireless base station 13, the client computer 15, and the cloud server 16 are connected by a communication line 18 such as a local area network (LAN), a wide area network (WAN), the Internet, or an intranet. The image forming device 12, the wireless base station 13, the client computer 15, and the cloud server 16 are able to transmit and receive various data to and from each other via the communication line 18. A portable terminal device 14 is wirelessly connected to the wireless base station 13 so that the portable terminal device 14 and various types of equipment are able to transmit and receive various data to and from each other.

In the information processing system 10 according to this exemplary embodiment, the cloud server 16 provides a cloud service as an example of a network service in accordance with a request from the client computer 15, the portable terminal device 14, and the like. In this exemplary embodiment, an example in which a printing service is provided as a cloud service will be described. Specifically, in accordance with an image forming instruction issued to the cloud server 16 from the client computer 15 or the like, the cloud server 16 provides a printing service for causing the image forming device 12 to perform image formation in accordance with the image forming instruction.

Figure 2:
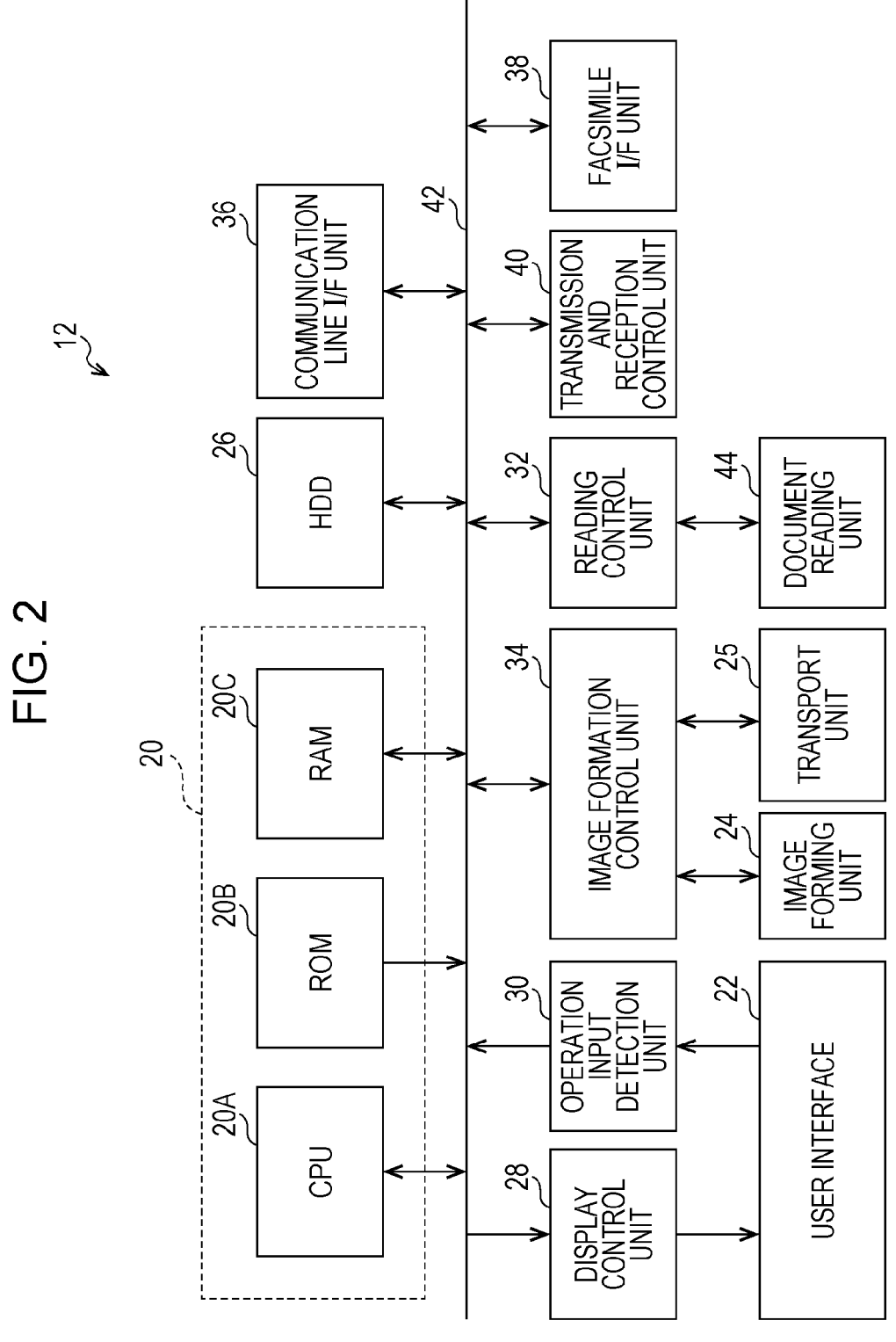
FIG. 2 is a block diagram illustrating a configuration of a principal part of an electrical system of an image forming device in the information processing system according to the exemplary embodiment.

FIG. 2 is a block diagram illustrating a configuration of a principal part of an electrical system of the image forming device 12 in the information processing system 10 according to this exemplary embodiment.

The image forming device 12 according to this exemplary embodiment includes, as illustrated in FIG. 2, a control unit 20 including a central processing unit (CPU) 20A, a read only memory (ROM) 20B, and a random access memory (RAM) 20C. The CPU 20A controls the entire operation of the image forming device 12. The RAM 20C is used as a work area and the like for execution of various programs by the CPU 20A. Various control programs, various parameters, and the like are stored in advance in the ROM 20B. In the image forming device 12, parts of the control unit 20 are electrically connected by a system bus 42.

Furthermore, the image forming device 12 according to this exemplary embodiment includes a hard disk drive (HDD) 26 that stores various data, application programs, and the like. The image forming device 12 also includes a display control unit 28 that is connected to a user interface 22. The display control unit 28 controls display of various operation screens on a display of the user interface 22. The image forming device 12 also includes an operation input detection unit 30 that is connected to the user interface 22. The operation input detection unit 30 detects an operation instruction received through the user interface 22. The HDD 26, the display control unit 28, and the operation input detection unit 30 are electrically connected to the system bus 42 in the image forming device 12. In the image forming device 12 according to this exemplary embodiment, the HDD 26 is used as a storing unit. However, the storing unit is not limited to the HDD 26. Other nonvolatile storing units such as a flash memory may be used.

Furthermore, the image forming device 12 according to this exemplary embodiment includes a reading control unit 32 that controls an operation of a document reading unit 44 for optically reading an image and an operation of a document transport unit for feeding a document and an image formation control unit 34 that controls processing of an image forming unit 24 for image formation and processing of a transport unit 25 for transporting paper to the image forming unit 24. The image forming device 12 also includes a communication line interface (I/F) unit 36 that is connected to the communication line 18. The communication line I/F unit 36 transmits and receives communication data to and from an external device such as the cloud server 16 connected to the communication line 18. The image forming device 12 also includes a facsimile I/F unit 38 that is connected to a telephone line, which is not illustrated in FIG. 1 or FIG. 2. The facsimile I/F unit 38 transmits and receives facsimile data to and from a facsimile device connected to the telephone line. The image forming device 12 also includes a transmission and reception control unit 40 that controls transmission and reception of facsimile data via the facsimile I/F unit 38. The transmission and reception control unit 40, the reading control unit 32, the image formation control unit 34, the communication line I/F unit 36, and the facsimile I/F unit 38 are electrically connected to the system bus 42 in the image forming device 12.

With the configuration described above, in the image forming device 12 according to this exemplary embodiment, the CPU 20A accesses the RAM 20C, the ROM 20B, and the HDD 26. In the image forming device 12, the CPU 20A also causes the display control unit 28 to control display of an operation screen and information such as various messages on the display of the user interface 22. In the image forming device 12, the CPU 20A also causes the reading control unit 32 to control operation of the document reading unit 44 and the document transport unit. In the image forming device 12, the CPU 20A also causes the image formation control unit 34 to control operation of the image forming unit 24 and the transport unit 25 and controls transmission and reception of communication data through the communication line I/F unit 36. In the image forming device 12, the CPU 20A also causes the transmission and reception control unit 40 to control transmission and reception of facsimile data through the facsimile I/F unit 38. Furthermore, in the image forming device 12, the CPU 20A also understands contents of operation using the user interface 22 based on operation information detected by the operation input detection unit 30 and performs various types of control based on the contents of the operation.

Figure 3:
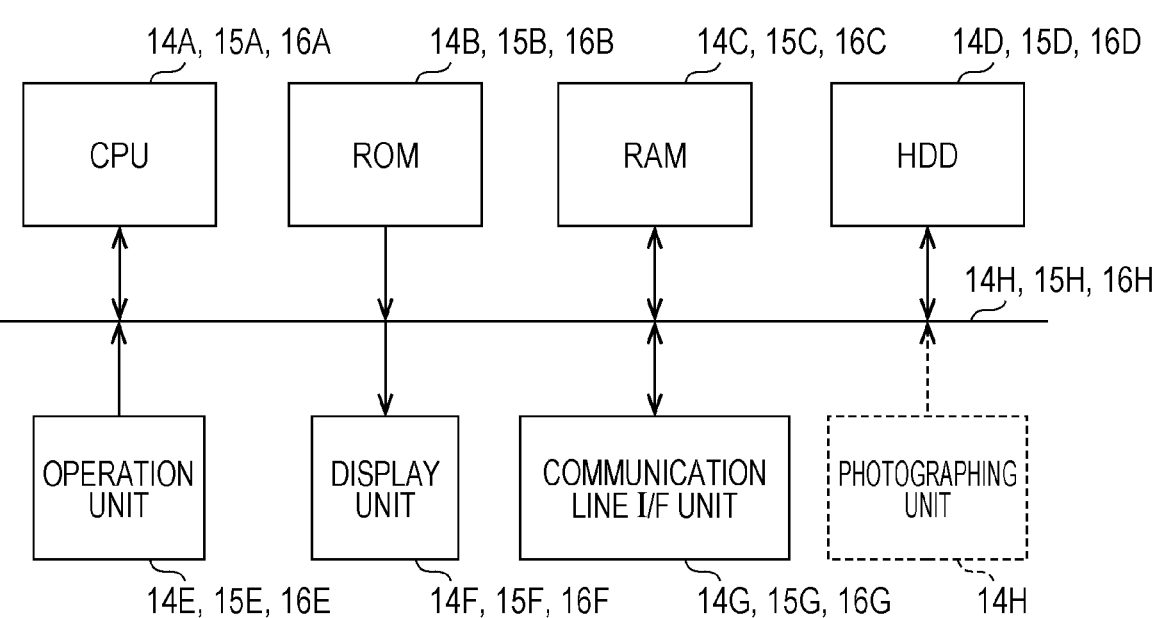
FIG. 3 is a block diagram illustrating a configuration of a principal part of an electrical system of a cloud server, a client computer, and a portable terminal device in the information processing system according to the exemplary embodiment.

Next, a configuration of a principal part of an electrical system of the cloud server 16, the client computer 15, and the portable terminal device 14 in this exemplary embodiment will be described. FIG. 3 is a block diagram illustrating a configuration of a principal part of an electrical system of the cloud server 16, the client computer 15, and the portable terminal device 14 in the information processing system 10 according to this exemplary embodiment. The cloud server 16, the client computer 15, and the portable terminal device 14 basically have a typical computer configuration. Thus, the configuration of the cloud server 16 will be described as a typical example.

The cloud server 16 in this exemplary embodiment includes, as illustrated in FIG. 3, a CPU 16A, a ROM 16B, a RAM 16C, an HDD 16D, an operation unit 16E, a display unit 16F, and a communication line I/F unit 16G. The CPU 16A controls the entire operation of the cloud server 16. Various control programs, various parameters, and the like are stored in advance in the ROM 16B. The RAM 16C is used as a work area and the like for execution of the various programs by the CPU 16A. Various data, application programs, and the like are stored in the HDD 16D. The operation unit 16E is used to input various types of information. The display unit 16F is used to display various types of information. The communication line I/F unit 16G is connected to the communication line 18 and transmits and receives various data to and from other equipment connected to the communication line 18. The communication line I/F unit 16G may be configured to be able to directly connect to other equipment using known wireless communication technologies. The units of the cloud server 16 described above are electrically connected to each other by a system bus 16H. In the cloud server 16 in this exemplary embodiment, the HDD 16D is used as a storing unit. However, the storing unit is not limited to the HDD 16D. Other nonvolatile storing units such as a flash memory may be used.

With the configuration described above, in the cloud server 16 in this exemplary embodiment, the CPU 16A accesses the ROM 16B, the RAM 16C, and the HDD 16D, acquires various data through the operation unit 16E, and displays various types of information on the display unit 16F. Furthermore, in the cloud server 16, the CPU 16A controls transmission and reception of communication data through the communication line I/F unit 16G.

The portable terminal device 14 and the client computer 15 basically have a typical computer configuration. As with the cloud server 16, the portable terminal device 14 and the client computer 15 are configured to include CPU 14A and 15A, ROMs 14B and 15B, RAMS 14C and 15C, and the like. Thus, a detailed description of the configuration of the portable terminal device 14 and the client computer 15 will be omitted.

Registration of the image forming device 12 to a printing service provided by the cloud server 16 and use of the printing service will be briefly described.

For registration of the image forming device 12 to the printing service, a machine administrator first instructs the image forming device 12 for registration to the printing service as a cloud service. In accordance with the registration instruction, the image forming device 12 requests the cloud server 16, which provides the printing service, to register the image forming device 12. Then, after necessary processing such as authentication processing, the image forming device 12 is registered to the printing service. At this time, meta information including functions supported by the image forming device 12 and the name of the image forming device is notified to the cloud server 16 from the image forming device 12 and registered to the printing service.

To use the printing service, a user operates the client computer 15, the portable terminal device 14, or the like to select an image forming device 12 as an output destination from the list of image forming devices 12 registered in the printing service and issue an image formation request. The image forming device 12 polls the cloud server 16 for an image formation request at every predetermined time. In the case where an image formation request is present, the image forming device 12 downloads printing data for which image formation processing is to be performed. The downloaded data is stored or printed as specified by the image forming device 12. If the setting is such that a print job is stored, the user performs a necessary authentication operation on the screen of the user interface 22 of the image forming device 12 so that image formation is performed. If the setting is such that a print job is immediately output, immediately after downloading the printing data from the cloud server 16, the image forming device 12 promptly performs image formation.

In a printing service in which a plurality of image forming devices 12 are registered, device names of the image forming devices 12 need to be easily identifiable so that a desired image forming device 12 is able to be easily identified from among the plurality of image forming devices 12.

Thus, the information processing system 10 according to this exemplary embodiment is configured to perform processing for easily setting a device name, compared to a case where a user creates and sets a device name of the image forming device 12 that is easily identifiable.

Figure 4:
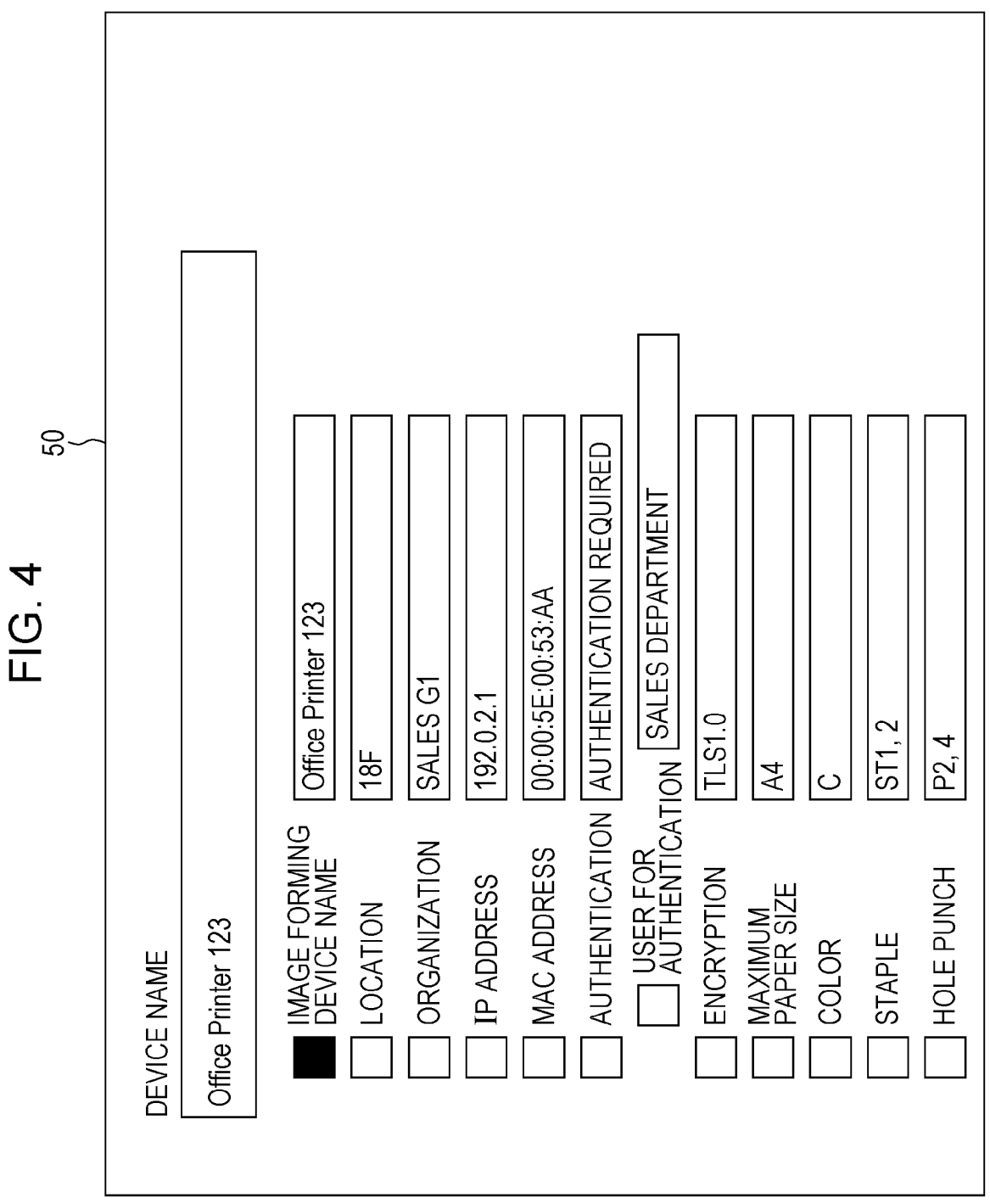
FIG. 4 is a diagram illustrating an example of a setting screen for setting the name of an image forming device.

Specifically, in this exemplary embodiment, the image forming device 12 has a setting screen 50 illustrated in FIG. 4 for setting a device name as the name of the image forming device 12 on the printing service. On the setting screen 50 illustrated in FIG. 4, a default name of an image forming device is displayed as a set value for a device name. Furthermore, held information of the image forming device is information including items of information regarding the image forming device, such as an image forming device name, location, organization, and IP address, and information set for each of the items. On the same screen, the items of the information regarding the image forming device, such as the image forming device name, location, organization, and IP address, and the information set for each of the items are displayed. Along with the items of the individual pieces of information regarding the image forming device, selection parts such as checkboxes for selecting items are displayed. The user checks a checkbox for a desired item of the held information so that the desired item of the held information and information set for the item are included in a device name. In the example of FIG. 4, only the image forming device name is checked for a default value. Thus, the image forming device name and the device name are the same. A checkbox is a type of component of a graphical user interface of a computer and is used for selecting a desired number of items out of a plurality of options. Typically, a blank or check mark is displayed in a square box.

Figure 5:
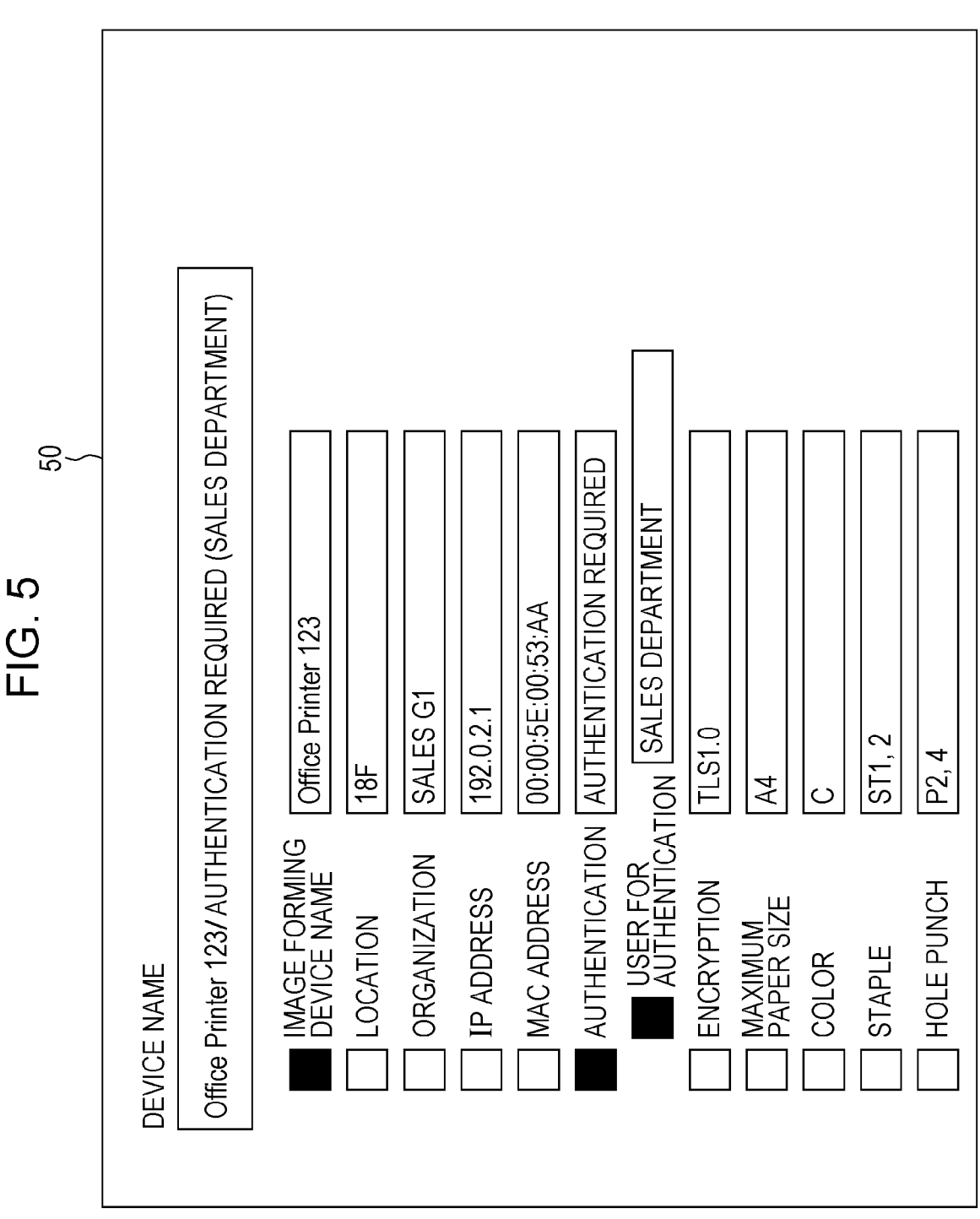
FIG. 5 is a diagram illustrating an example of a setting state of the setting screen.

In an example illustrated in FIG. 5, information indicating whether or not authentication is required and information regarding a user who is able to be authenticated, as well as an image forming device name, are checked. Accordingly, information indicating that authentication is required, as well as the image forming device name, are added to the device name. The additional information may be separated by a separator and added or may be separated by space. In the example of FIG. 5, information of a user for authentication is provided as sub-information of authentication, and the user for authentication is indicated in a parenthesis.

Furthermore, in addition to the addition of an item by putting a check in a checkbox, a desired character string may be received. For example, for the device name illustrated in FIG. 4 or 5, a character string of an item received as the device name using a checkbox or the like may be editable. In this case, an edited character string may be received as the device name or a desired character string may be added. Alternatively, a character string for a displayed item may be edited or a desired character string may be added.

Figure 6:
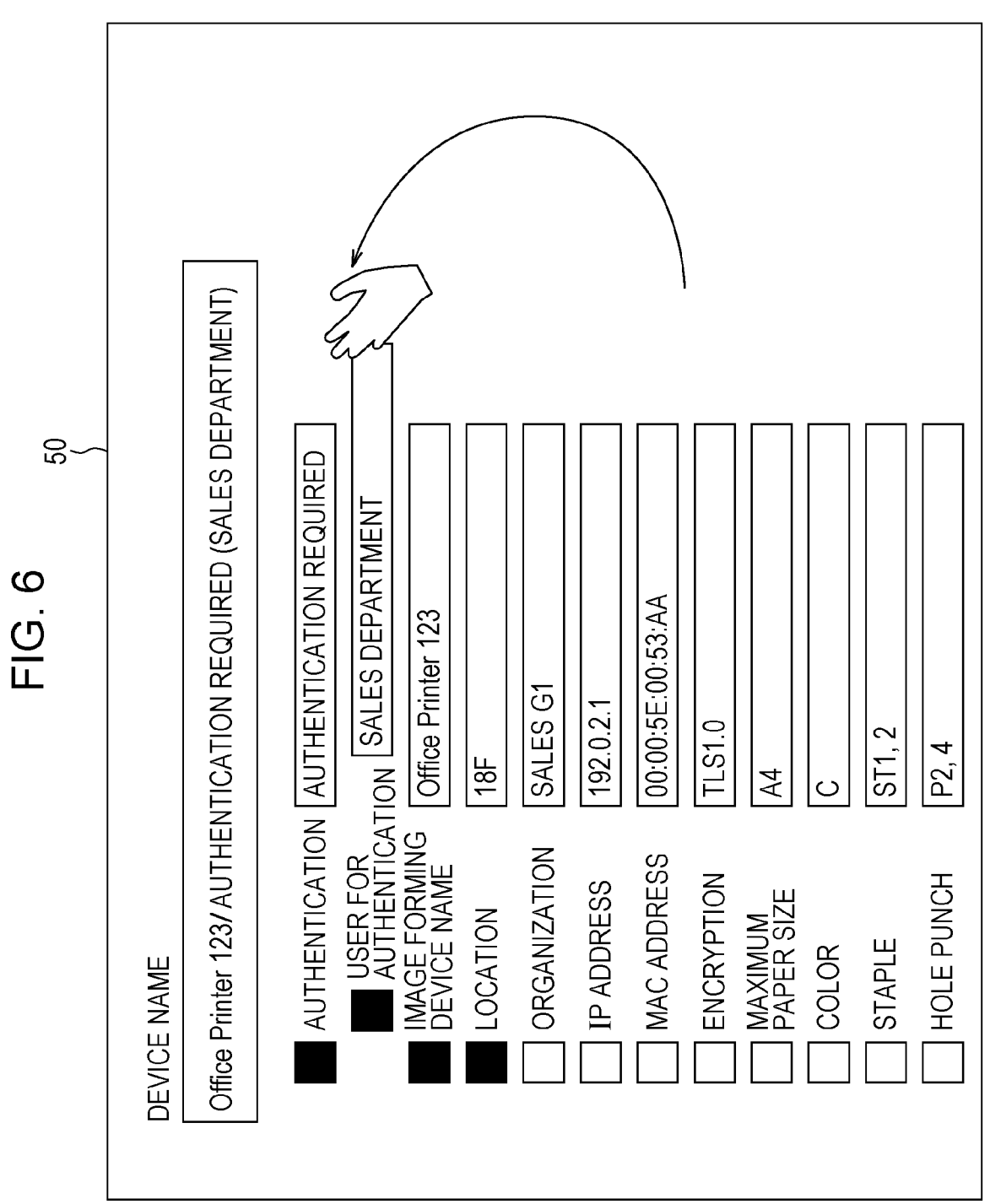
FIG. 6 is a diagram illustrating how a display order is changed by an operation such as drag and drop.

As illustrated in FIG. 6, for example, a moving operation such as drag and drop may be performed so that a display order is changed. In this case, for example, information indicating whether or not authentication is required is displayed prior to the image forming device name, so that the possibility of incorrect output to an image forming device 12 that does not require authentication is reduced. In the example of FIG. 6, an example in which the display position of information regarding whether or not authentication is required is moved forward, compared to the setting screens 50 illustrated in FIGS. 4 and 5 is illustrated. The display order may be changed in a way other than drag and drop. For example, a user interface for specifying the display order of items may be added, and the items may be displayed in a specified order.

Alternatively, a user may add a character string of a desired item to a desired position in a character string of a name by performing a moving operation such as drag and drop and set the edited character string of the name as the device name.

Next, specific processes performed by components of the information processing system 10 configured as described above according to this exemplary embodiment will be described.

Figure 7:
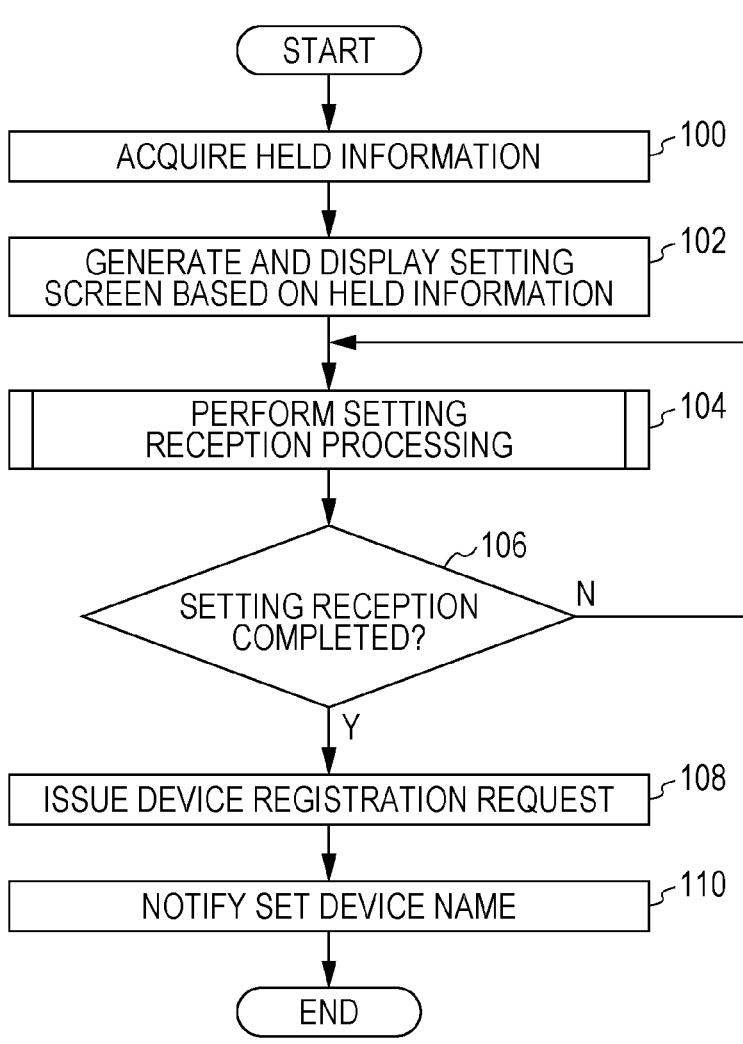
FIG. 7 is a flowchart of an example of a process performed by the image forming device for registering the image forming device to a printing service in the information processing system according to the exemplary embodiment.

A specific process performed by the image forming device 12 for registering the image forming device 12 to the printing service will be described. FIG. 7 is a flowchart illustrating an example of a process performed by the image forming device 12 for registering the image forming device 12 to the printing service in the information processing system 10 according to this exemplary embodiment. For example, the process illustrated in FIG. 7 starts when a machine administrator issues to the image forming device 12 an instruction for registration to the printing service.

In step 100, the CPU 20A acquires held information of the image forming device 12, and then proceeds to step 102. For example, the CPU 20A acquires, as held information, information set for the image forming device, such as an image forming device name, location, organization, and IP address that are set in advance.

In step 102, the CPU 20A generates the setting screen 50 based on the acquired held information, displays the setting screen 50 on the display of the user interface 22, and then proceeds to step 104. For example, the setting screen 50 illustrated in FIG. 4 is displayed.

In step 104, the CPU 20A performs setting reception processing, and then proceeds to step 106. In the setting reception processing, for example, the CPU 20A receives an operation on a checkbox on the setting screen 50 illustrated in FIG. 4 and displays the received information as a device name on the setting screen 50.

In step 106, the CPU 20A determines whether or not setting reception is completed. In this determination, for example, it is determined whether or not an operation for ending the setting screen 50 has been performed. In the case where the result of the determination is negative, the CPU 20A returns to step 104 and continues the setting reception processing. In the case where the result of the determination is affirmative, the CPU 20A proceeds to step 108.

In step 108, the CPU 20A issues a device registration request to the cloud server 16, and then proceeds to step 110.

In step 110, the CPU 20A notifies the cloud server 16 of the set device name, and ends the series of processing operations.

Figure 8:
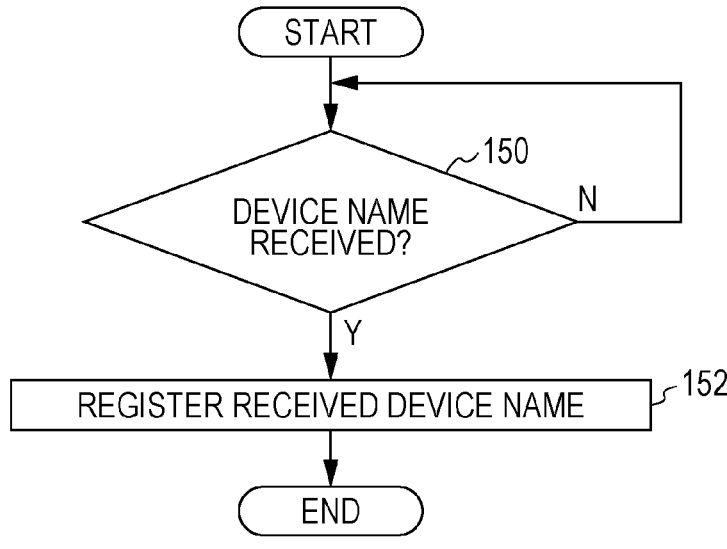
FIG. 8 is a flowchart of an example of a process performed by the cloud server when a device registration request is issued from the image forming device in the information processing system according to the exemplary embodiment.

Next, a specific process performed by the cloud server 16 when a device registration request is issued from the image forming device 12 will be described. FIG. 8 is a flowchart illustrating an example of a process performed by the cloud server 16 when a device registration request is issued from the image forming device 12 in the information processing system 10 according to this exemplary embodiment. For example, the process illustrated in FIG. 8 starts when the image forming device 12 issues a device registration request in step 108 as described above.

In step 150, the CPU 16A determines whether or not the CPU 16A has received the device name transmitted from the image forming device 12. The CPU 16A waits until the result of the determination becomes affirmative, and then proceeds to step 152.

In step 152, the CPU 16A registers the received device name, and ends the series of processing operations. That is, the received device name is registered as the device name on the printing service.

In the exemplary embodiment described above, the case where the image forming device 12 has the setting screen 50 for setting a device name to be registered to the printing service has been described. However, the cloud server 16 may have the setting screen 50. In the case where the image forming device 12 has the setting screen 50, the image forming device 12 corresponds to an example of an information processing device. In the case where the cloud server 16 has the setting screen 50, the cloud server 16 corresponds to an example of an information processing device and the image forming device 12 corresponds to an example of a device.

As a modification of the information processing system 10 according to this exemplary embodiment, a case where the cloud server 16 has the setting screen 50 will be described. The basic configuration of the information processing system 10 according to this modification is the same as the configuration of the information processing system 10 according to the exemplary embodiment described above. Thus, description of the configuration of the information processing system 10 according to this modification will be omitted, and specific processes performed by components of the information processing system 10 according to this modification will be described.

Figure 9:
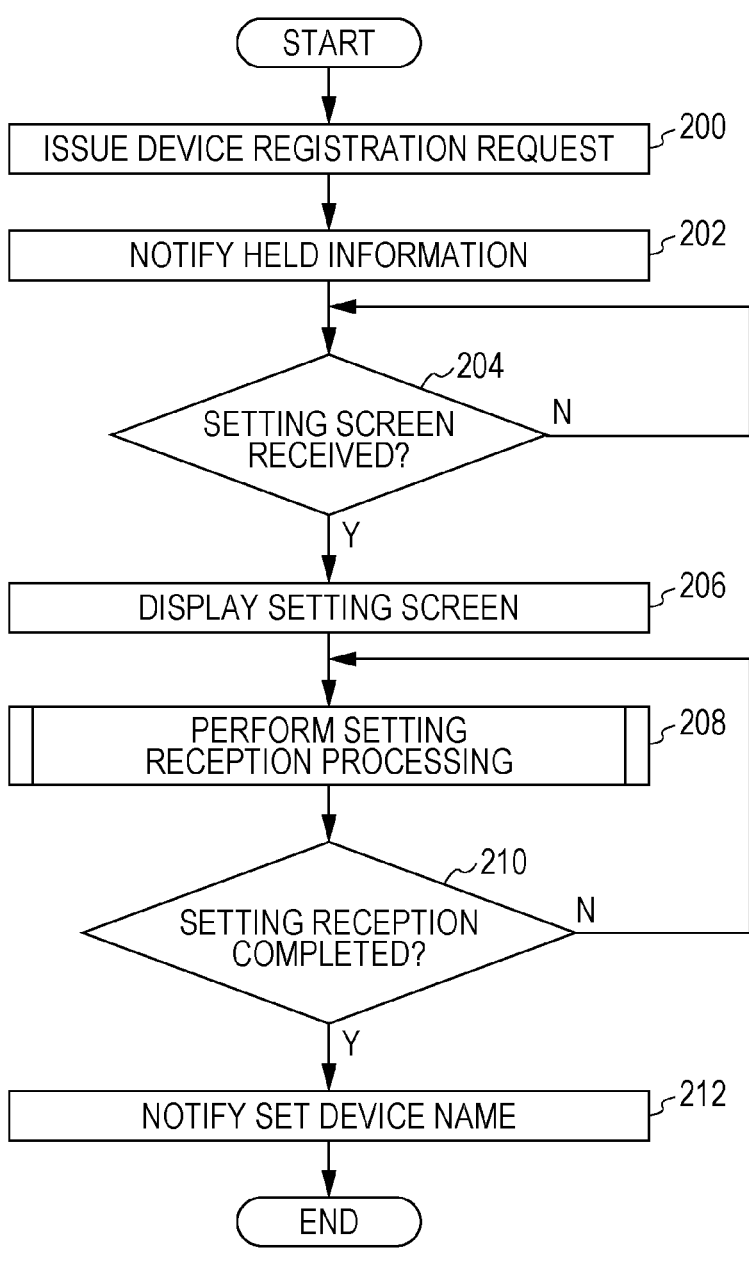
FIG. 9 is a flowchart of an example of a modification of the process performed by the image forming device for registering the image forming device to the printing service in the information processing system according to the exemplary embodiment.

First, a modification of the specific process performed by the image forming device 12 for registering the image forming device 12 to the printing service will be described. FIG. 9 is a flowchart illustrating an example of a modification of the process performed by the image forming device 12 for registering the image forming device 12 to the printing service in the information processing system 10 according to the exemplary embodiment. For example, the process illustrated in FIG. 9 starts when a machine administrator issues to the image forming device 12 an instruction for registration to the printing service.

In step 200, the CPU 20A issues a device registration request to the cloud server 16, and then proceeds to step 202.

In step 202, the CPU 20A notifies the cloud server 16 of held information of the image forming device 12, and then proceeds to step 204. For example, the CPU 20A notifies the cloud server 16 of, as held information, information set for the image forming device, such as an image forming device name, location, organization, and IP address that are set in advance.

In step 204, the CPU 20A determines whether or not the CPU 20A has received the setting screen 50 from the cloud server 16. The CPU 20A waits until the result of the determination becomes affirmative, and then proceeds to step 206.

In step 206, the CPU 20A displays the received setting screen 50 on the display of the user interface 22, and then proceeds to step 208.

In step 208, the CPU 20A performs setting reception processing, and then proceeds to step 210. In the setting reception processing, for example, the CPU 20A receives an operation on a checkbox on the setting screen 50 illustrated in FIG. 4 and displays the received information as a device name on the setting screen 50.

In step 210, the CPU 20A determines whether or not setting reception is completed. In this determination, for example, it is determined whether or not an operation for ending the setting screen 50 has been performed. In the case where the result of the determination is negative, the CPU 20A returns to step 208 and continues the setting reception processing. In the case where the result of the determination is affirmative, the CPU 20A proceeds to step 212.

In step 212, the CPU 20A notifies the cloud server 16 of the set device name, and ends the series of processing operations.

Figure 10:
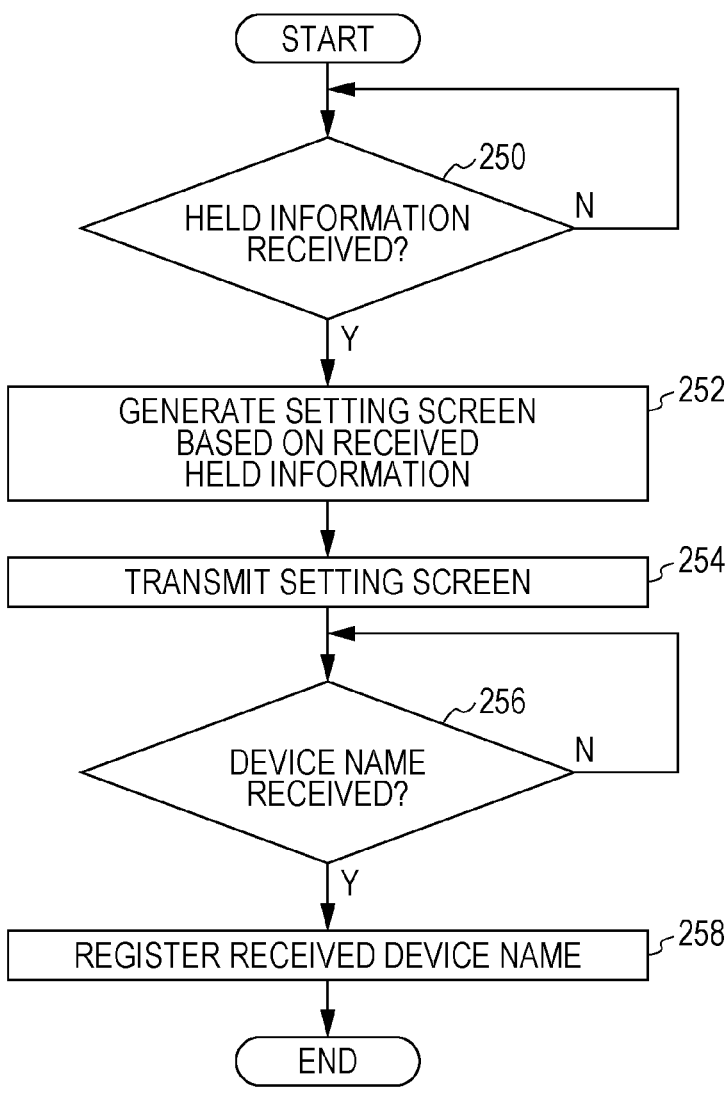
FIG. 10 is a flowchart of an example of a modification of the process performed by the cloud server when the device registration request is issued from the image forming device in the information processing system according to the exemplary embodiment.

Next, a modification of the specific process performed by the cloud server 16 when a device registration request is issued from the image forming device 12 will be described. FIG. 10 is a flowchart illustrating an example of the modification of the process performed by the cloud server 16 when a device registration request is issued from the image forming device 12 in the information processing system 10 according to the exemplary embodiment. For example, the process illustrated in FIG. 10 starts when the image forming device 12 issues a device registration request in step 200 as described above.

In step 250, the CPU 16A determines whether or not the CPU 16A has received held information from the image forming device 12. The CPU 16A waits until the result of the determination becomes affirmative, and then proceeds to step 252. That is, by receiving held information transmitted from the image forming device 12, the CPU 16A acquires the held information.

In step 252, the CPU 16A generates the setting screen 50 based on the held information received from the image forming device 12, and then proceeds to step 254. For example, the CPU 16A generates the setting screen 50 illustrated in FIG. 4.

In step 254, the CPU 16A transmits the generated setting screen 50 to the image forming device 12, and then proceeds to step 256.

In step 256, the CPU 16A determines whether or not the CPU 16A has received a device name from the image forming device 12. The CPU 16A waits until the result of the determination becomes affirmative, and then proceeds to step 258.

In step 258, the CPU 16A registers the device name received from the image forming device 12, and ends the series of processing operations. That is, the received device name is registered as the device name on the printing service.

Figure 11:
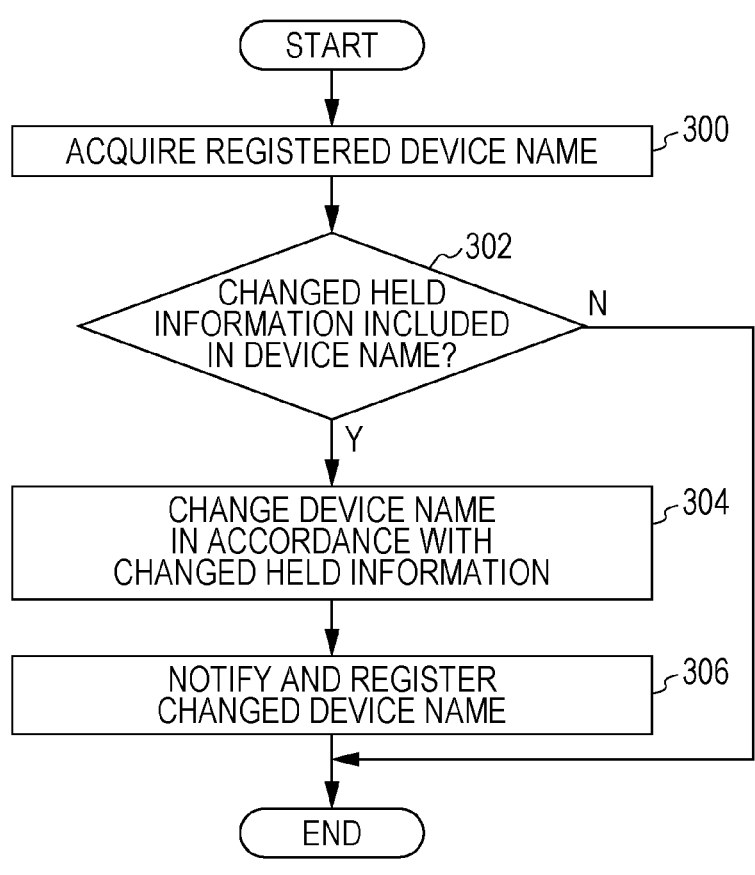
FIG. 11 is a flowchart of an example of a process performed by the image forming device for updating a device name when held information is changed or updated in the information processing system according to the exemplary embodiment.

In the exemplary embodiment described above, if the held information held by the image forming device 12 is changed or updated, the device name registered in the printing service may be updated in accordance with the changed or updated held information. For example, the image forming device 12 performs a process illustrated in FIG. 11. FIG. 11 is a flowchart illustrating an example of a process performed by the image forming device 12 for updating a device name in the case where held information is changed or updated. The process illustrated in FIG. 11 starts when held information of the image forming device 12 (for example, an image forming device name, location, organization, IP address, MAC address, authentication, encryption, etc.) is changed or updated.

In step 300, the CPU 20A acquires a registered device name in the printing service from the cloud server 16, and then proceeds to step 302.

In step 302, the CPU 20A determines whether or not changed held information is included in the device name. In this determination, it is determined whether or not held information changed by change or update is included in the acquired device name. In the case where the result of the determination is affirmative, the CPU 20A proceeds to step 304. In the case where the result of the determination is negative, the CPU 20A ends the process.

In step 304, the CPU 20A changes the device name in accordance with the changed held information, and then proceeds to step 306. That is, the CPU 20A changes the acquired device name such that the held information included in the device name is replaced with the changed held information.

In step 306, the CPU 20A notifies the cloud server 16 of the changed device name and registers the changed device name. Then, the CPU 20A ends the series of processing operations.

Figure 12:
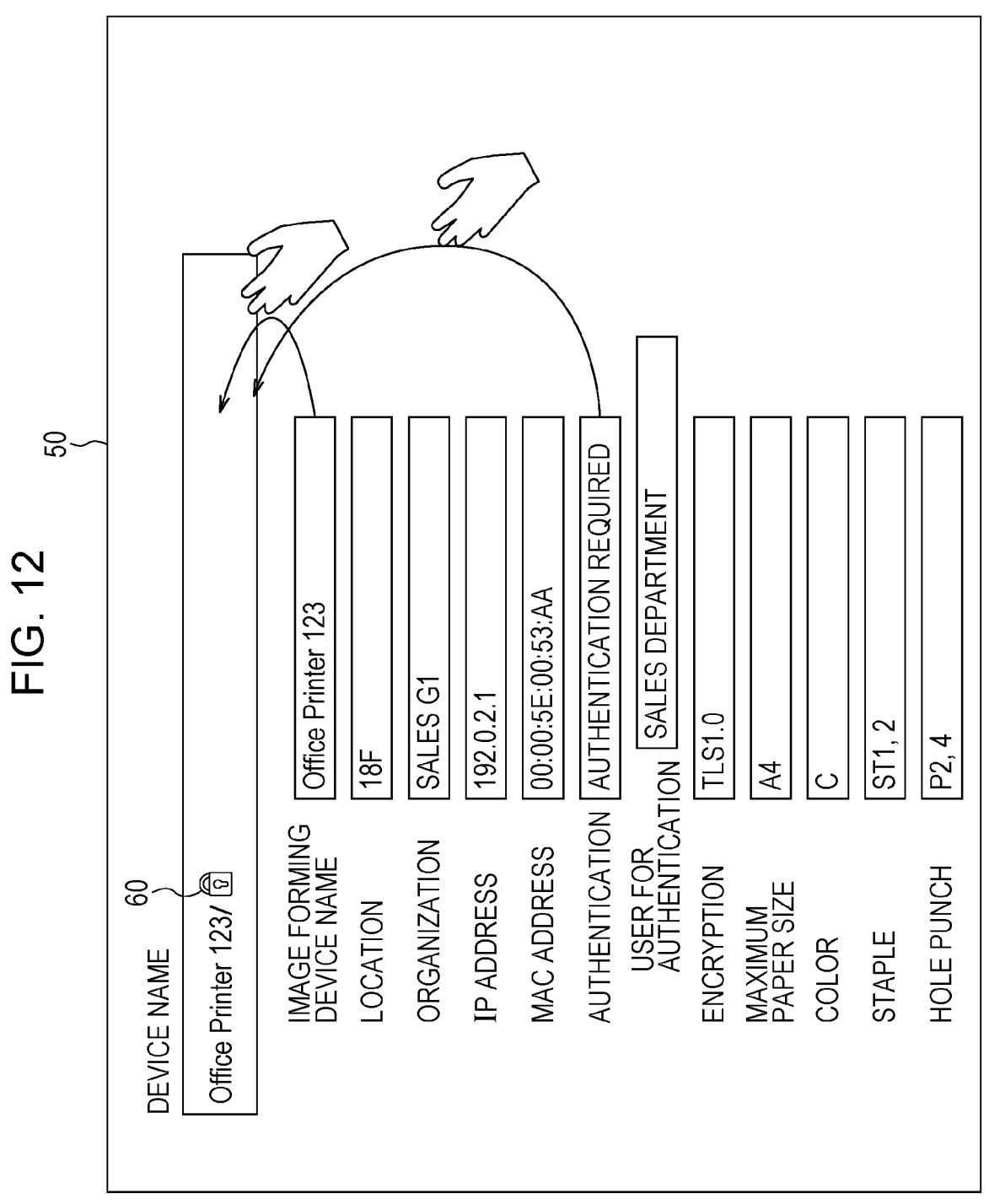
FIG. 12 is a diagram illustrating an example of dragging and dropping an item to add the item to a device name.

In the exemplary embodiment described above, the example in which an item to be included in a device name is selected using a checkbox has been described. However, an item to be included in a device name is not necessarily specified as described above. For example, as illustrated in FIG. 12, an item may be dragged and dropped so that the item is added to a device name.

Furthermore, in the exemplary embodiment described above, the example in which held information of the image forming device 12 displayed on the setting screen 50 is displayed in the form of character strings has been described. However, the held information is not necessarily displayed in the form of character strings. For example, the held information may be replaced with an image such as an icon and displayed so that information regarding a checked function is able to be easily understood. For example, as illustrated in FIG. 12, for the image forming device 12 that requires authentication, an image such as a key mark 60 representing an image of a key may be displayed. Accordingly, the number of characters displayed is reduced.

Furthermore, in the exemplary embodiment described above, registration of the device name of the image forming device 12 to the printing service has been described as an example. However, the device name of the image forming device 12 is not necessarily registered to the printing service. For example, a device name may be registered to other various cloud services such as a document storage service. Furthermore, devices other than the image forming device 12, such as an image processing device and an image reading device, may be registered.

Furthermore, processes performed by components of the information processing system 10 according to the exemplary embodiments described above may be performed by software or hardware or may be performed by the combination of software and hardware. Furthermore, processes performed by components of the information processing system 10 may be stored as programs in a storing medium and distributed.

Furthermore, it is obvious that the present disclosure is not limited to the exemplary embodiments and modifications described above and various changes may be made to the present disclosure without departing from the scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
   acquire, when setting a device name of the information processing device or a device connected to a predetermined network service, held information held by the information processing device or the device;
   output a setting screen for displaying the acquired held information comprising a first item;
   receive a selection of the first item of the held information from the setting screen and set the first item of the held information as the device name of the information processing device or the device;
   display a first checkbox for the first item of the held information and set a first displayed content corresponding to the first item as the device name in response to the first checkbox having been selected; and
   display a second checkbox for a second item of the held information and add a second displayed content corresponding to the second item to the device name in response to the second checkbox having been selected in addition to the first checkbox having been selected.

2. The information processing device according to claim 1, wherein the processor is configured to, by receiving an operation for changing an order of an item of the held information from a location to another location.

3. The information processing device according to claim 1, wherein the processor is configured to, by receiving an operation for changing an order of an item of the held information from a first location to a second location.

4. The information processing device according to claim 3, wherein the processor is configured to set the device name based on a text of the item moved to the second location.

5. The information processing device according to claim 1, wherein the processor is configured to set, as the device name, a predetermined image representing the held information selected on the setting screen.

6. The information processing device according to claim 2, wherein the processor is configured to set, as the device name, a predetermined image representing the held information selected on the setting screen.

7. The information processing device according to claim 3, wherein the processor is configured to set, as the device name, a predetermined image representing the held information selected on the setting screen.

8. The information processing device according to claim 4, wherein the processor is configured to set, as the device name, a predetermined image representing the held information selected on the setting screen.

9. The information processing device according to claim 1, wherein the processor is configured to further receive editing of the held information displayed on the setting screen, receive a result of selection of the edited held information, and set the selected edited held information as the device name.

10. The information processing device according to claim 2, wherein the processor is configured to further receive editing of the held information displayed on the setting screen, receive a result of selection of the edited held information, and set the selected edited held information as the device name.

11. The information processing device according to claim 3, wherein the processor is configured to further receive editing of the held information displayed on the setting screen, receive a result of selection of the edited held information, and set the selected edited held information as the device name.

12. The information processing device according to claim 1, wherein the processor is configured to, when the held information is changed or updated, update the set device name to be replaced based on the changed or updated held information.

13. An information processing system comprising:
the information processing device according to claim 1; and
a cloud server that provides the network service and receive setting of the device name from the information processing device.

14. An information processing system comprising:
the information processing device according to claim 1; and
a device that notifies the information processing device of held information held by the device, displays the setting screen output from the information processing device, receives a result of selection of the held information, and transmits the selected held information to the information processing device.

15. An information processing method comprising:
acquiring, when setting a device name of the information processing device or a device connected to a predetermined network service, held information held by the information processing device or the device;
outputting a setting screen for displaying the acquired held information comprising a first item;
receiving a selection of the first item of the held information from the setting screen and set the first item of the held information as the device name of the information processing device or the device;
displaying a first checkbox for the first item of the held information and set a first displayed content corresponding to the first item as the device name in response to the first checkbox having been selected; and
displaying a second checkbox for a second item of the held information and add a second displayed content corresponding to the second item to the device name in response to the second checkbox having been selected in addition to the first checkbox having been selected.

16. A non-transitory computer readable medium storing a program causing a computer to execute a process for information processing, the process comprising:
acquiring, when setting a device name of the information processing device or a device connected to a predetermined network service, held information held by the information processing device or the device;

outputting a setting screen for displaying the acquired held information comprising a first item;

receiving a selection of the first item of the held information from the setting screen and set the first item of the held information as the device name of the information processing device or the device;

displaying a first checkbox for the first item of the held information and set a first displayed content corresponding to the first item as the device name in response to the first checkbox having been selected; and displaying a second checkbox for a second item of the held information and add a second displayed content corresponding to the second item to the device name in response to the second checkbox having been selected in addition to the first checkbox having been selected.

\* \* \* \* \*